United States Patent
Wu et al.

(10) Patent No.: US 10,601,245 B2
(45) Date of Patent: Mar. 24, 2020

(54) POWER REDUNDANT SYSTEM AND OPERATION METHOD FOR THE SAME

(71) Applicant: DELTA ELECTRONICS, INC., Taoyuan (TW)

(72) Inventors: Chih-Ming Wu, Taoyuan (TW); Chien-Yu Lin, Taoyuan (TW); Chih-Chiang Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 121 days.

(21) Appl. No.: 15/708,501

(22) Filed: Sep. 19, 2017

(65) Prior Publication Data

US 2018/0159364 A1  Jun. 7, 2018

(30) Foreign Application Priority Data

Dec. 6, 2016 (CN) .......................... 2016 1 1109960

(51) Int. Cl.
| | |
|---|---|
| *H02J 9/06* | (2006.01) |
| *G06F 1/26* | (2006.01) |
| *H02J 4/00* | (2006.01) |
| *G06F 1/28* | (2006.01) |

(52) U.S. Cl.
CPC .............. *H02J 9/061* (2013.01); *G06F 1/263* (2013.01); *G06F 1/28* (2013.01); *H02J 4/00* (2013.01)

(58) Field of Classification Search
CPC .. H02J 9/061; H02J 4/00; G06F 1/263; G06F 1/28

USPC ........................................................... 307/65
See application file for complete search history.

(56) References Cited

U.S. PATENT DOCUMENTS

| | | | |
|---|---|---|---|
| 6,747,369 B2 | 6/2004 | Griffith et al. | |
| 2007/0217125 A1* | 9/2007 | Johnson .................. | H02J 9/062 361/600 |
| 2011/0068625 A1* | 3/2011 | Duan .................. | G06F 11/2015 307/29 |
| 2015/0214779 A1* | 7/2015 | Tomassi .................. | H02J 9/061 307/65 |

* cited by examiner

*Primary Examiner* — Carlos Amaya
(74) *Attorney, Agent, or Firm* — Hauptman Ham, LLP

(57) ABSTRACT

A power redundant system includes a switch module, a power-supplying module and a control unit. The switch module includes switch units. Each switch unit switches a power as an input power. The power-supplying module includes power-supplying units. Each power-supplying unit is connected to a switch unit correspondingly and converts the input power into an output power and supplies the output power to a load. The control unit controls the switch units to switch one of input sources of the power as the input power. If one of the switch units or power-supplying units is not operational, an electric power supplied by the power-supplying units connected to the remaining switch units correspondingly is greater than or equal to an electric power required by the load. When one of the input sources is abnormal, the control unit controls the switch units to switch to another input source.

20 Claims, 8 Drawing Sheets

POWER REDUNDANT SYSTEM AND OPERATION METHOD FOR THE SAME

BACKGROUND

Field of the Invention

The present invention relates to a power redundant system and an operation method for the same, and especially relates to a high reliability centralized power redundant system and an operation method for the same.

Description of the Related Art

As the science and technology are advancing rapidly, the requirement of the data-processing center is increasing. The computers and the related equipment in a data-processing center are used to process mass data to provide convenient, reliable and fast services to assist various departments in the business unit, to increase production capacity. The services provided by the data-processing center greatly influence the efficiency and the achievement of the other units in an organization. Large amounts of data are sent from the far-end terminal to the computer host of the data-processing center, and then the data is processed by the computer host. According to requirements, the data-processing center often has to operate 24 hours a day. The power of the data-processing center is designed specially to maintain the stability of the data-processing center. Therefore, power redundant systems are arranged at the front ends of most of the data-processing centers. When the input power is abnormal, the power redundant system switches to use the backup power to continue to provide the data-processing center with the required power.

FIG. 1 shows a block diagram of the related art power redundant system. The power redundant system 100A converts a power Vs into an output power Vo and supplies the output power Vo to the load 40A (for example, the data-processing center) in the back end. The power redundant system 100A comprises a switch module 10A (which has a high power capacity module) and a plurality of power supplies (P1-1~P1-M) which are connected to the switch module 10A, wherein the switch module 10A is an automatic transfer switch (ATS). Currently, the power redundant system 100A supplies the power Vs to the power supplies (P1-1~P1-M) in the whole rack through only one single automatic transfer switching. When the automatic transfer switching malfunctions, the power supplies (P1-1~P1-M) in the whole rack fail and influences the data-processing center in the back end. Accordingly, the reliability of the whole power redundant system 100A is poor.

It is desirable to design a power redundant system and an operation method for the same to maintain the stability of the data-processing center.

SUMMARY

According to an aspect of the present invention, a power redundant system is provided which comprises a switch module and a power-supplying module. The switch module comprises a plurality of switch units. Each switch unit switches a power as (namely, to obtain) an input power. The power-supplying module comprises a plurality of power-supplying units. Each power-supplying unit is connected to a switch unit correspondingly and converts the input power into an output power and supplies the output power to a load. The switch module and the power-supplying module are configured such that if one of the switch units or one of the power-supplying units is not operational, an electric power supplied by the power-supplying units connected to the remaining switch units correspondingly is greater than or equal to an electric power required by the load.

According to another aspect of the present invention, an operation method is provided for a power redundant system which comprises a plurality of switch units and a plurality of power-supplying units which are connected to the switch units correspondingly. The operation method comprises following steps. (a) A plurality of input sources is converted to supply an output power to a load. (b) The switch units are controlled to switch one of the input sources as an input power. (c) If one of the switch units or one of the power-supplying units is not operational, the power-supplying units connected to the remaining switch units correspondingly supply an electric power which is greater than or equal to an electric power required by the load. (d) If one of the input sources is determined to be inadequate, the switch units are controlled to switch to another input source.

BRIEF DESCRIPTION OF DRAWINGS

Figures are provided as references for descriptions, and the present invention is not limited by the figures.

DESCRIPTION OF EMBODIMENTS

Figure 1:
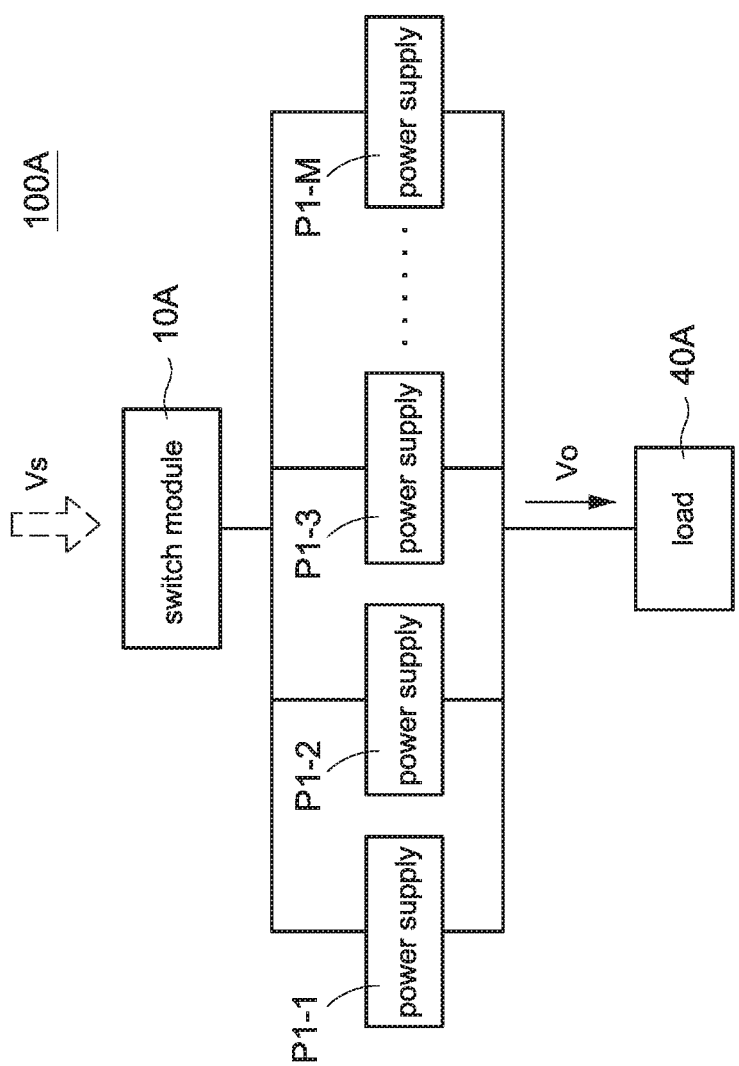
FIG. 1 shows a block diagram of a related art power redundant system.
Figure 2:
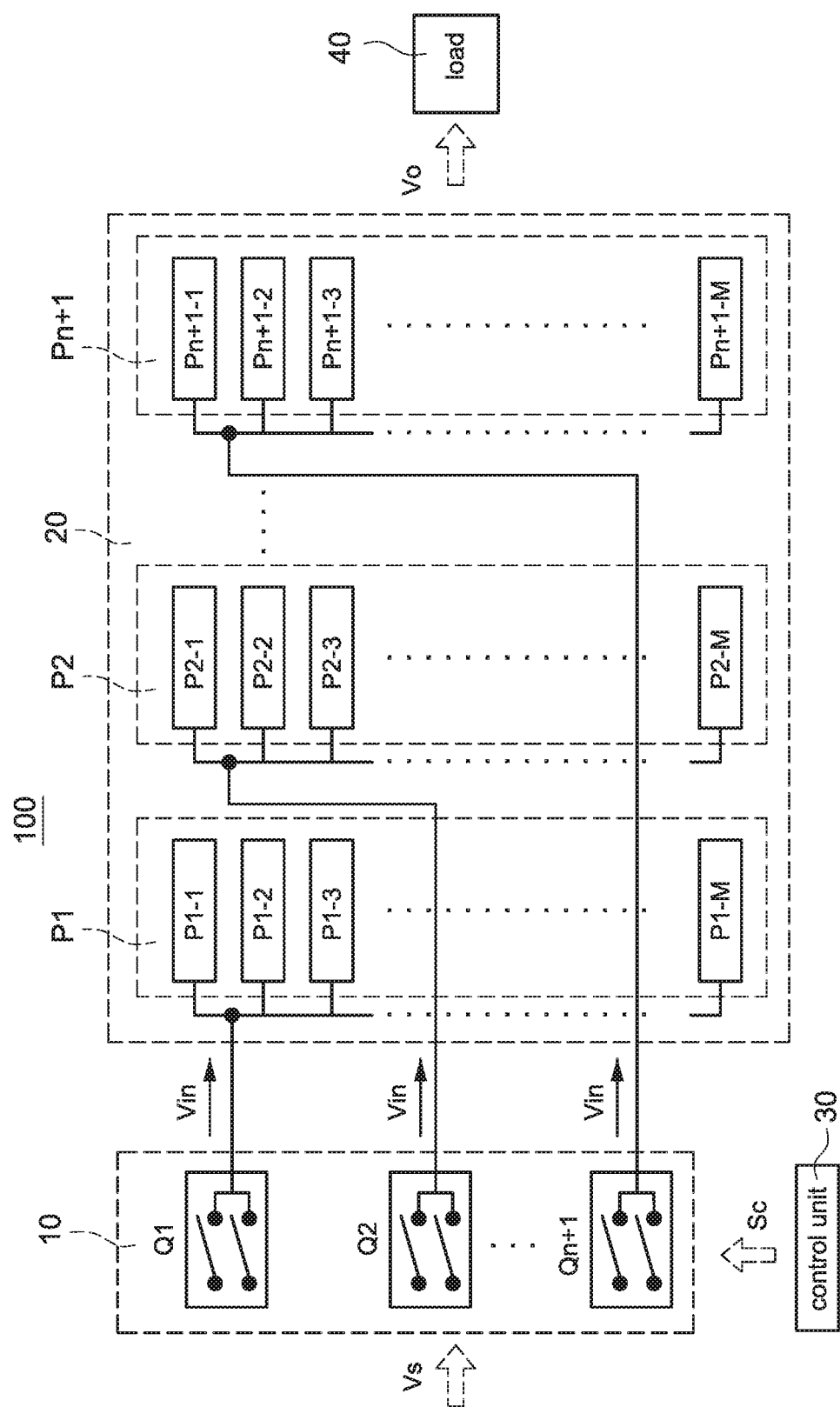
FIG. 2 shows a block diagram of a power redundant system according to a first embodiment of the present invention.

Referring to FIG. 2, a power redundant system 100 receives a power Vs and supplies power (namely, the output power Vo mentioned below) to a load 40. The power redundant system 100 comprises a switch module 10, a power-supplying module 20 and a control unit 30. The switch module 10 receives the power Vs and switches the power Vs as (namely, to obtain) an input power Vin. The power-supplying module 20 is connected between the switch module 10 and the load 40, and converts the input power Vin into an output power Vo and supplies power (namely, the output power Vo) to the load 40. According to a status of the power Vs received by the power redundant system 100, the control unit 30 sends a control signal Sc to control an on-off status of the switch module 10. Moreover, power forms of the power Vs, the input power Vin and the output power Vo can be, for example but not limited to, voltage sources, current sources and so on. In another word, as long as the power form can supply power, it is envisaged for the embodiments of the present invention. Moreover, the power Vs is at least an input source and is further described later.

Please refer to FIG. 2 again. The switch module 10 comprises a plurality of switch units Q1~Qn+1. Each switch unit Q1~Qn+1 receives the power Vs respectively and switches a power Vs as (namely, to obtain) the input power Vin. The power-supplying module 20 comprises a plurality of power-supplying units P1~Pn+1. Each power-supplying unit P1~Pn+1 is connected to the switch unit Q1~Qn+1 correspondingly and converts the input power Vin into the output power Vo and supplies the output power Vo to the load 40. The control unit 30 sends the control signal Sc to control the on-off status of the switch module 10 to switch to the input source which is suitable for the power redundant system 100.

The power redundant system 100 is an "n+1" redundant system, wherein the symbol "n+1" means that the power redundant system 100 comprises n+1 power-supplying units P1~Pn+1, wherein a total electric power supplied by the n power-supplying units P1~Pn is greater than or equal to an electric power required by the load 40, wherein the remaining one power-supplying unit Pn+1 from the n+1 power-supplying units P1~Pn+1 is a redundant (namely, backup) power-supplying unit Pn+1. When one of the switch units Q1~Qn+1 (assuming the Qn+1) or one of the power-supplying units P1~Pn+1 (assuming the Pn+1) malfunctions, and the path cannot output power to the load 40 at the back end normally, the total electric power supplied by the power-supplying units P1~Pn connected to the remaining switch units Q1~Qn correspondingly is still greater than or equal to the electric power required by the load 40. This maintains the normal operation of the load 40 to achieve the redundant efficiency. Taking FIG. 2 as an example, when one of the switch units Q1~Qn+1 (assuming the Qn+1) malfunctions, the power-supplying unit Pn+1 which is connected correspondingly cannot output the output power Vo. However, the power redundant system 100 is the "n+1" redundant system, so that the remaining power-supplying units P1~Pn still can stably provide the load 40 with the required electric power to avoid the power redundant system 100 being unable to provide the load 40 with the required electric power resulting in a load failure of the load 40. When one of the power-supplying units P1~Pn+1 (assuming the power-supplying unit P2) malfunctions, the power-supplying unit P2 cannot output the output power Vo or cannot supply the electric power which is the same as the electric power supplied by the other power-supplying units P1, P3~Pn+1. However, the power redundant system 100 is the "n+1" redundant system, so that the remaining power-supplying units P1, P3~Pn+1 still can stably provide the load 40 with the required electric power to avoid the power redundant system 100 being unable to provide the load 40 with the required electric power resulting in the load failure of the load 40. Moreover, the electric power mentioned in the present invention can be the voltage, current, power capacity and so on. For example, as shown in FIG. 2, assume that the n is equal to 10 and the power required by the load 40 in the normal operation is 1000 watts, so the maximum output power provided by each of the power-supplying units P1~P11 should be designed more than 1000/n=1000/10=100 watts when designing the power-supplying units P1~P11. The whole power redundant system 100 comprises n+1 power-supplying units P1~P11. That means, beside the original 10 power-supplying units P1~P10, the power-supplying unit P11 is added extra. Therefore, when one of the power-supplying units P1~P11 (assuming the power-supplying unit P11) or one of the switch units Q1~Q11 (assuming the switch unit Q11) malfunctions such that it cannot supply the 100 watts output power, a total output power of the remaining power-supplying units P1~P10 is still more than 1000 watts to meet the electric power requirement of the load 40.

As shown in FIG. 2, each power-supplying unit P1~Pn+1 comprises a plurality of power supplies P1-1~P1-M (in the example of the power-supplying unit P1). The switch units Q1~Qn+1 are connected to the power supplies P1-1~Pn+1-M of the power-supplying units P1~Pn+1 correspondingly. When one of the power supplies P1-1~Pn+1-M malfunctions, for example the power supply P2-2, the output power Vo outputted by the power-supplying unit P2 is abnormal. However, the power redundant system 100 is the "n+1" redundant system, so the total electric power supplied by the remaining power-supplying unit P1, P3~Pn+1 is still greater than or equal to the electric power required by the load 40. This avoids the power redundant system 100 being unable to provide the load 40 with the required electric power resulting in the load 40 being unable to operate. Moreover, the symbol "M" means that each of the power-supplying units P1~Pn+1 (assuming the power-supplying unit P1) comprises M power supplies (P1-1~P1-M).

Figure 3:
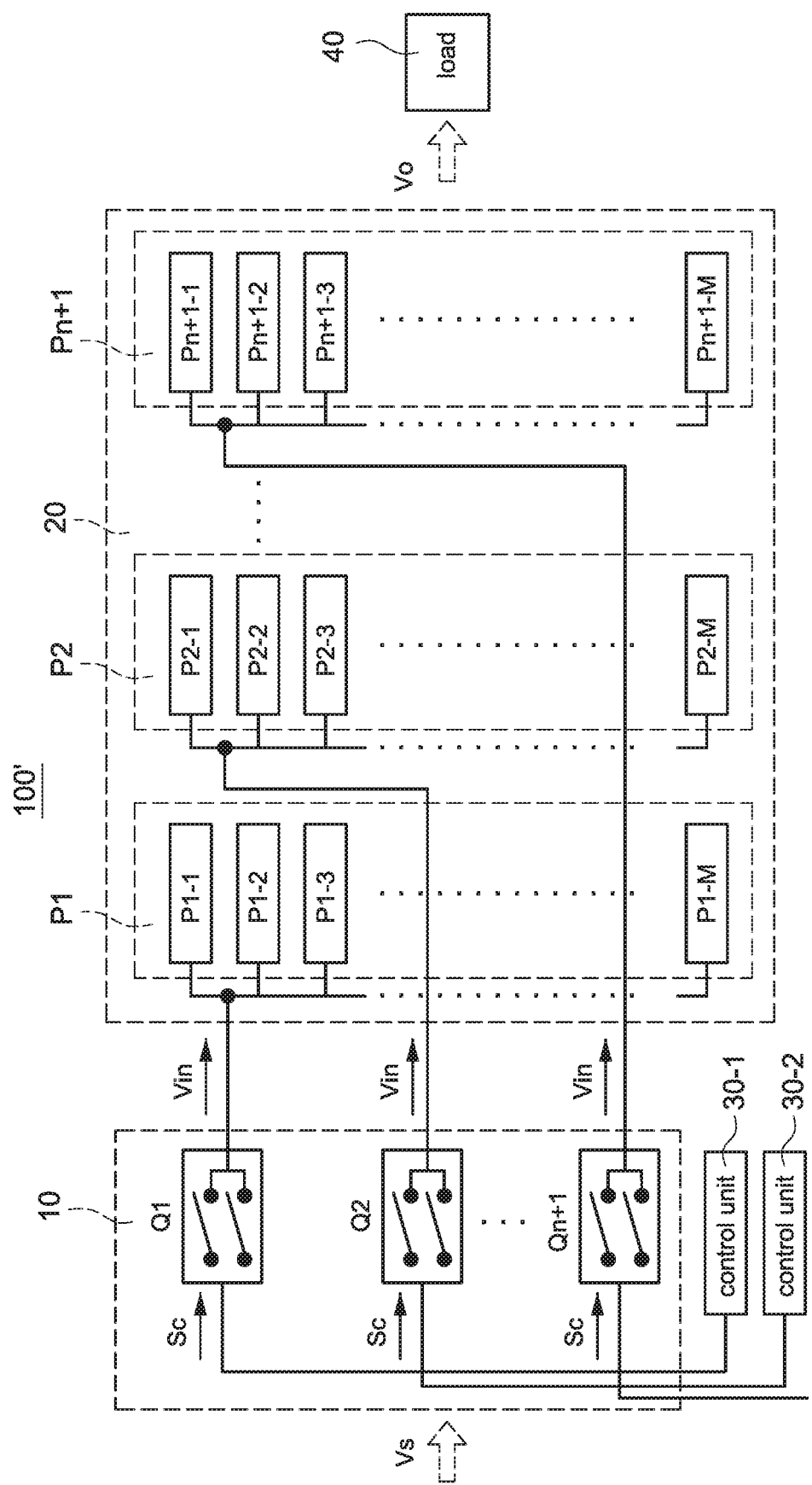
FIG. 3 shows a block diagram of a power redundant system according to a second embodiment of the present invention.

Referring to FIG. 3, a second embodiment similar to the first embodiment is provided, having the difference that a power redundant system 100' comprises a plurality of control units 30-1~30-$n$+1. Each of the control units 30-1~30-$n$+1 is connected to the switch unit Q1~Qn+1 correspondingly to control the switch unit Q1~Qn+1 respectively. According to the status of the power Vs received by the power redundant system 100', the control units 30-1~30-$n$+1 respectively sends the control signal Sc to control an on-off status of the switch unit Q1~Qn+1 of the switch module 10 respectively. Because one single control unit 30-1~30-$n$+1 controls one single switch unit Q1~Qn+1 in the power redundant system 100', one of the control units 30-1~30-$n$+1 malfunctioning does not cause all switch units Q1~Qn+1 to not work and resulting in all of the power-supplying units P1~Pn+1 does not receive the power Vs. Thus a situation in which the power redundant system 100' cannot provide the load 40 with the required electric power and the load 40 cannot operate is avoided.

Figure 4:
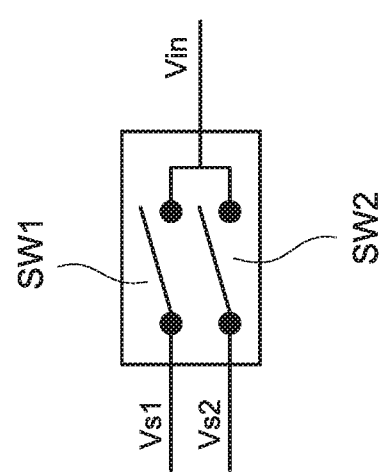
FIG. 4 shows a circuit diagram of a switch unit according to an embodiment of the present invention.

Referring to FIG. 4 together with FIG. 2 and FIG. 3, each switch unit Q1~Qn+1 comprises a first switch SW1 and a second switch SW2. One side of the first switch SW1 receives a first input source Vs1 of the power Vs. One side of the second switch SW2 receives a second input source Vs2 of the power Vs. The other side of the first switch SW1 is connected to the other side of the second switch SW2, and outputs the input power Vin. When the control unit 30 controls the first switch SW1 to be turned on, the first input source Vs1 is the input power Vin. When the control unit 30 controls the second switch SW2 to be turned on, the second input source Vs2 is the input power Vin. When the power redundant system 100 operates, the control unit 30 is configured to turn on the first switch SW1 or the second switch SW2, to output the first input source Vs1 or the second input source Vs2. The power-supplying unit P1~Pn+1 converts the first input source Vs1 or the second input source Vs2 into the output power Vo correspondingly. When one of the first input source Vs1 and the second input source Vs2 is abnormal, the control unit 30 controls the switch units Q1~Qn+1 to switch to another input source. Moreover, the power Vs is not limited to comprise only the first input source Vs1 and the second input source Vs2. In other words, the power Vs can comprise a plurality of the input sources or only one single input source, and the quantity of the switches of each switch unit Q1~Qn+1 depends on the quantity of the input sources.

Taking FIG. 2 as an example and referring to FIG. 4, assuming that the power redundant system 100 takes the first input source Vs1 as the input power Vin, when the control unit 30 detects that the first input source Vs1 is abnormal, the control unit 30 controls the first switch SW1 to be turned off, and turns on the second switch SW2 to switch to the second input source Vs2 as the input power Vin. The switch units Q1~Qn+1 can be, for example but not limited to, automatic transfer switches (ATS), and can be semiconductor switches or mechanical switches. That is, any switch unit which can achieve the efficiency of the present invention mentioned above should be included in the embodiments of the present invention.

Figure 5:
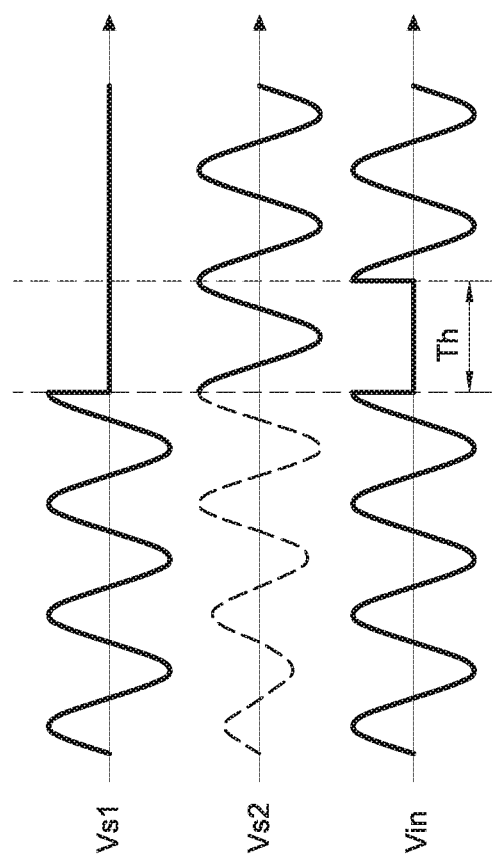
FIG. 5 shows a switching waveform diagram of the switches according to an embodiment of the present invention.

Referring to FIG. 5 together with FIGS. 2~4, the power redundant system 100 detects the first input source Vs1 and the second input source Vs2. When the quality of one of the input sources is better, the control unit 30 is configured to turn on the switch which is in accordance with the input source having the better quality. Taking FIG. 5 as an example, the quality of the first input source Vs1 is initially better, so the first switch SW1 is turned on. When the quality of the first input source Vs1 is lower than a threshold value or there is not the first input source Vs1, the control unit 30 turns off the first switch SW1 and turns on the second switch SW2, so that the input power Vin is switched from the first input source Vs1 to the second input source Vs2. There is a switching time Th when switching between the first input source Vs1 and the second input source Vs2 by the first switch SW1 and the second switch SW2 of the switch units Q1~Qn+1. More specifically, the switching time Th is a delay time between a timing of the first switch SW1 being turned off and a timing of the second switch SW2 being turned on. The delay time has to be the time that the power-supplying units P1~Pn+1 can tolerate to have no input power Vin temporarily. For example, the threshold value can preferably be set within 10% tolerance of the baseline value of the input source. However, in order to avoid the first input source Vs1 being lower than the threshold value while the second input source Vs2 being also not within the threshold value standard and there is not the input power Vin, the threshold value is not limited to be set within 10% tolerance of the baseline value of the input source. Moreover, in order to avoid the switching time Th being too long and affecting the output power Vo supplied to the load 40 by the power redundant system 100, the switching time Th may be preferably set within (namely, less than or equal to) ten milliseconds.

Figure 6A:
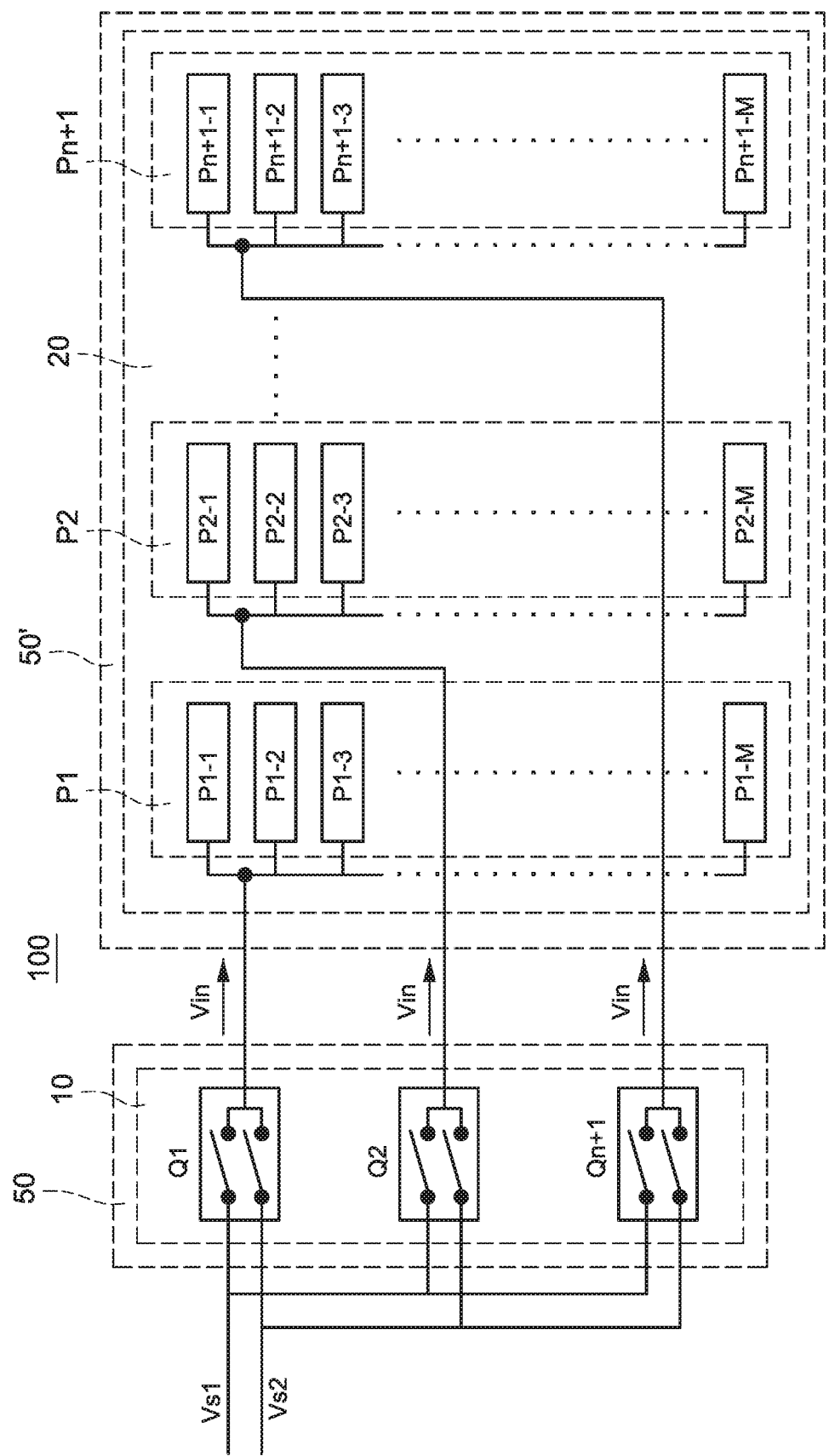
FIG. 6A shows a circuit structure diagram of the first embodiment of the present invention.
Figure 6B:
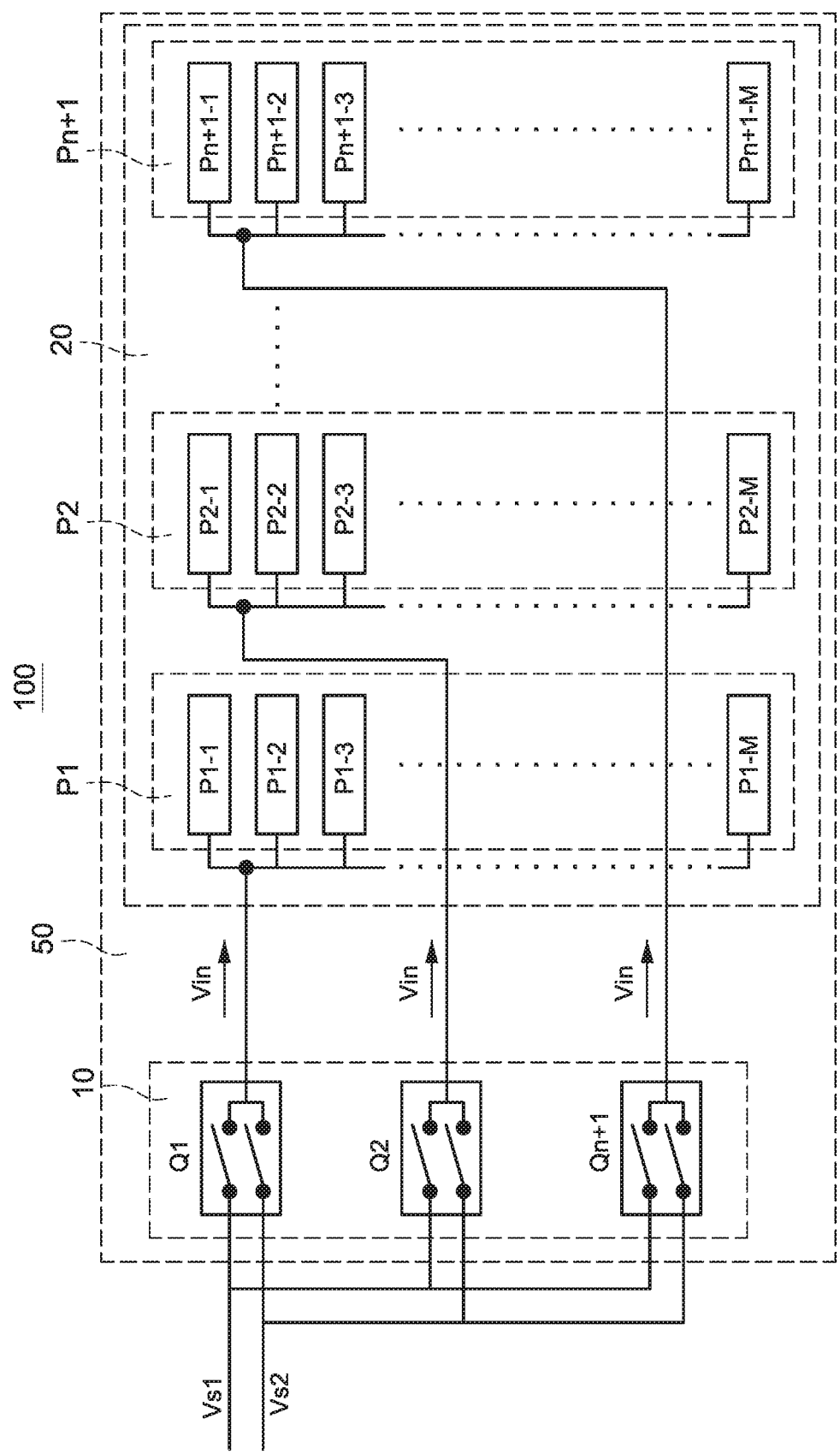
FIG. 6B shows a circuit structure diagram of the second embodiment of the present invention.

Referring to FIG. 6A, the switch module 10 is accommodated in a first rack 50. The power-supplying module 20 is accommodated in a second rack 50'. As shown in FIG. 6A, the switch module 10 and the power-supplying module 20 are accommodated in different racks, which allows them be arranged in different places (for example, different rooms) and may provide for managing the switch module 10 and the power-supplying module 20 individually. Referring to FIG. 6B, the switch module 10 and the power-supplying module 20 are accommodated in the first rack 50. A circuit structure of the switch module 10 and the power-supplying module 20 which are integrated in one single rack may help centrally manage the power redundant system 100.

Figure 6C:
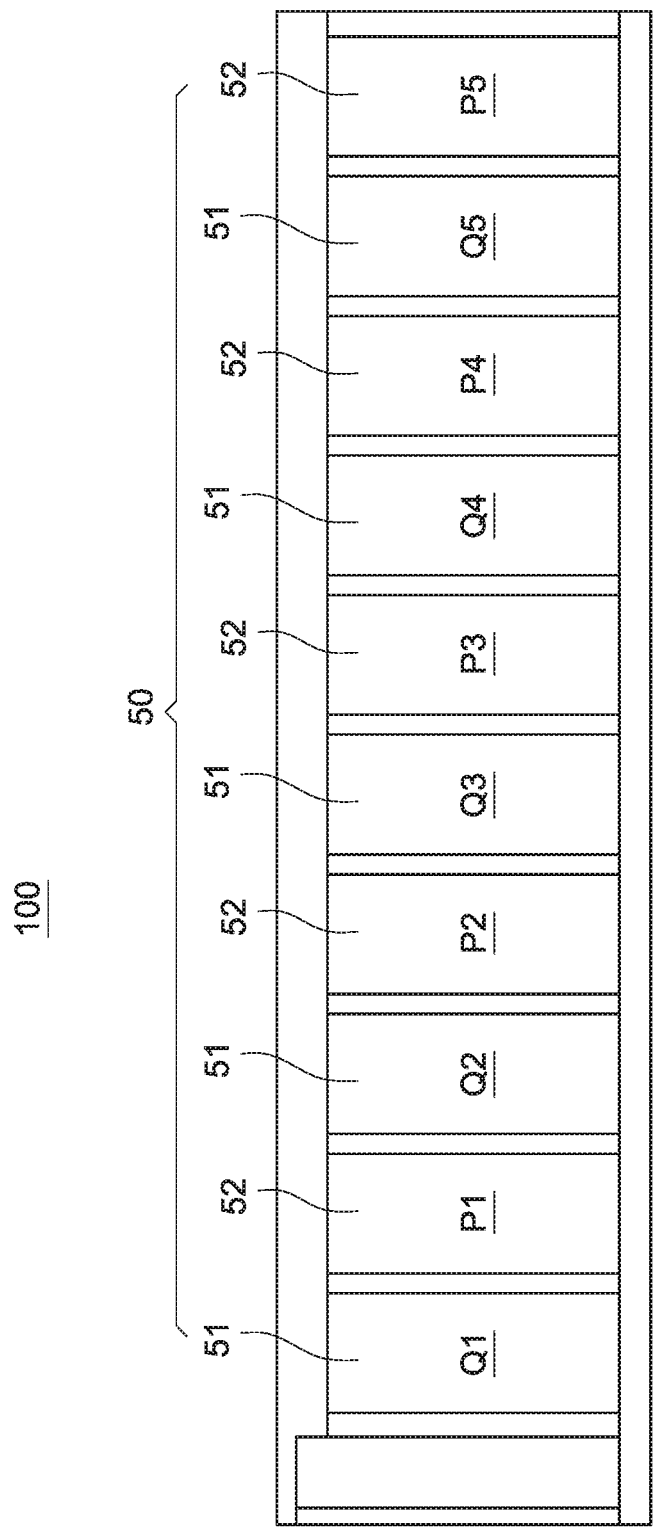
FIG. 6C shows a physical structure diagram of the second embodiment of the present invention.

Referring to FIG. 6C together with FIGS. 2-4 and 6B, the power redundant system 100 shown in FIG. 6C shows a physical structure in which the switch module 10 and the power-supplying module 20 are integrated in one single rack. The first rack 50 comprises a plurality of first accommodation spaces 51 and a plurality of second accommodation spaces 52. The first accommodation spaces 51 and the second accommodation spaces 52 are interlaced beside each other to form an accommodation structure. The first accommodation spaces 51 or the second accommodation spaces 52 accommodate the switch units Q1~Qn+1 or the power-supplying units P1~Pn+1. The switch units Q1~Qn+1 and the power-supplying units P1~Pn+1 can be arranged in the first accommodation spaces 51 and the second accommodation spaces 52 randomly. The control unit 30-1~30-$n$+1 can be arranged in the same accommodation space with the switch units Q1~Qn+1, or the control unit 30-1~30-$n$+1 can be arranged outside the accommodation space of the switch units Q1~Qn+1.

In the example shown, the power redundant system 100 comprises five switch units Q1~Q5 accommodated in the first accommodation spaces 51 and five power-supplying units P1~P5 accommodated in the second accommodation spaces 52. The five switch units Q1~Q5 and the five power-supplying units P1~P5 are, for example but not limited to, interlaced beside each other in the accommodation structure mentioned above. Accommodation locations of the five switch units Q1~Q5 and the five power-supplying units P1~P5 can be arranged randomly to provide flexible management of the power redundant system 100. Taking FIG. 6C as an example, when each power-supplying unit P1~P5 (which is controlled by the switch unit Q1~Q5) only comprises one power supply P1-1 (for example the power-supplying unit P1), the setup from left to right in FIG. 6C is: Q1, P1-1, Q2, P2-1, Q3, P3-1, Q4, P4-1, Q5 and P5-1. When each power-supplying unit P1~P5 (which is controlled by the switch unit Q1~Q5) comprises two power supplies P1-1~P1-2 (for example the power-supplying unit P1), the setup from left to right in FIG. 6C is: Q1, P1-1, P1-2, Q2, P2-1, P2-2, Q3, P3-1, P3-2, Q4, P4-1, P4-2, Q5, P5-1 and P5-2. The locations of the switch units Q1~Q5 and the power-supplying units P1~P5 can be arranged randomly as well.

Figure 7:
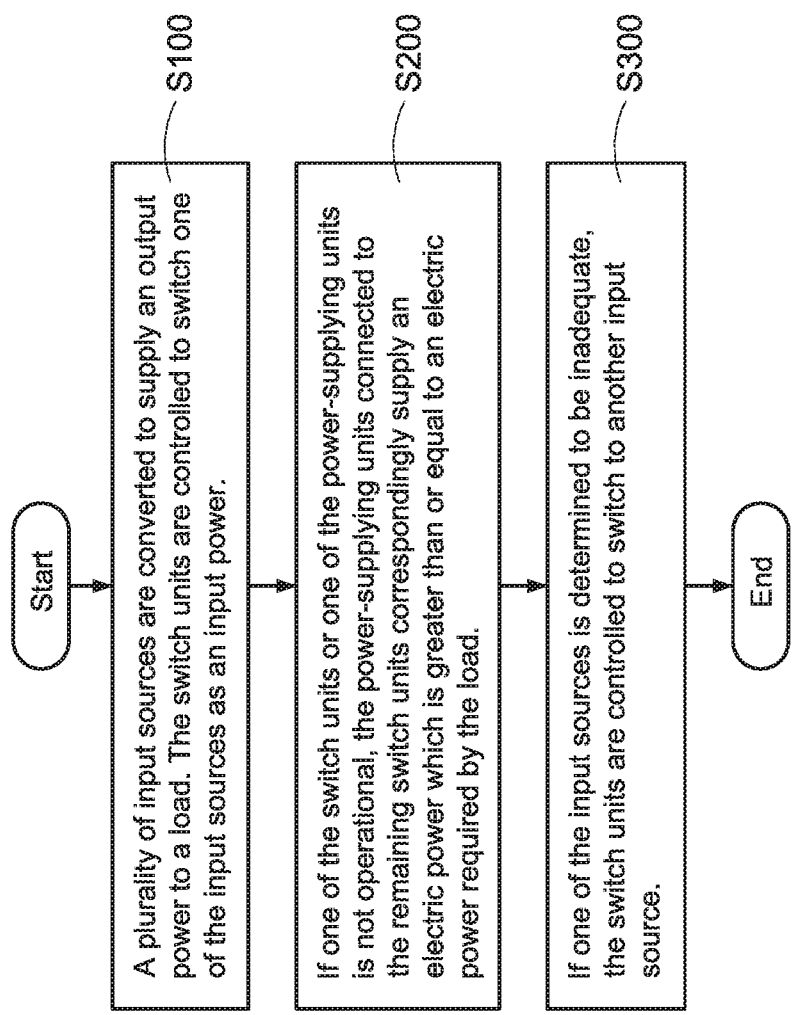
FIG. 7 shows a flow chart of an operation method for a power redundant system according to an embodiment of the present invention.

Referring to FIG. 7 together with FIGS. 2-5, the power redundant system 100 comprises a plurality of switch units Q1~Qn+1 and a plurality of power-supplying units P1~Pn+1 which are connected to the switch units Q1~Qn+1 correspondingly. The operation method comprises following steps. First, a plurality of input sources is converted to supply an output power to a load. The switch units are controlled to switch one of the input sources as an input power (S100). If one of the switch units or one of the power-supplying units is not operational, the power-supplying units connected to the remaining switch units correspondingly supply an electric power which is greater than or equal to an electric power required by the load (S200). If one of the input sources is determined to be inadequate, the switch units are controlled to switch to another input source (S300). Taking FIGS. 4-5 as an example, the power Vs comprises a first input source Vs1 and a second input source Vs2. When the quality of one of the input sources is lower than a threshold value or there is no input source, the control unit 30 controls the switch units Q1~Qn+1 to switch to another input source, so that the load 40 can operate smoothly.

Moreover, the operation method further comprises: Control the switch units to switch from a first input source to a second input source if the first input source is determined to be inadequate, and control the switch units to switch from a second input source to a first input source if the second input source is determined to be inadequate. Further, the operation method may switch from the first input source to the second input source within a first switching time, and switch from the second input source to the first input source within a second switching time. The first switching time and/or the second switching time may be equal to or less than ten milliseconds.

It is desirable for the present invention to provide a high reliability redundant automatic transfer switch (ATS). The disclosed power redundant system 100 is an "n+1" redundant system. There are n power-supplying units P1~Pn at least supplying the required electric power to the load 40 to maintain the normal operation of the load 40 and to achieve the redundant efficiency.

The present disclosure may have one or more of following advantages:

1. The power redundant system comprises a plurality of the automatic transfer switches (ATS) to be connected to a plurality of the power-supplying units correspondingly, avoiding problems of one single automatic transfer switch malfunctioning resulting in the failure of the overall power redundant system.

2. The power redundant system is an "n+1" redundant system, which comprises a redundant (namely, backup) power-supplying unit and n power-supplying units, wherein the n power-supplying units at least can supply the required electric power to the load. When one of the automatic transfer switches or one of the power-supplying units malfunctions in operation, the electric power supplied by the power-supplying units connected to the remaining automatic transfer switches correspondingly is still greater than or equal to the electric power required by the load. This can effectively stabilize the load at the back end to operate smoothly.

3. One single conventional automatic transfer switch is replaced by a plurality of the automatic transfer switches, so that the power redundant system evenly distributes the power capacity to each of the automatic transfer switches. Therefore, the specification of the automatic transfer switch can be medium-low power capacity. No automatic transfer switch with special specification high power is required to match the power redundant system, so there are more kinds of the automatic transfer switches which are compatible with the power redundant system, and increasing cost due to the automatic transfer switch with special specification is avoided.

4. A plurality of the control units controls a plurality of the switch units correspondingly. This is advantageous over a single control unit, since if the single control unit malfunctions, all of the switch units malfunctioning resulting that all of the power-supplying units do not receive power. Therefore, the power redundant system can avoid situations in which it's unable to provide the load with the required electric power resulting in the load failure.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power redundant system comprising:
   a switch module comprising a plurality of switch units, each switch unit switching a power as an input power; and
   a power-supplying module comprising a plurality of power-supplying units, wherein each switch unit is configured to switch on to connect only one corresponding power-supplying unit to the input power for use by the power-supplying module to convert the input power into an output power and supplying the output power to a load, and wherein the switch module and the power-supplying module are configured such that if one of the switch units or one of the power-supplying units is not operational, an electric power supplied by the power-supplying units connected to the remaining switch units correspondingly is greater than or equal to an electric power required by the load.

2. The power redundant system in claim 1, wherein the power comprises a plurality of input sources provided to the switch units to switch one of the input sources as the input power.

3. The power redundant system in claim 2, further comprising:
   a control unit connected to the switch units, the control unit being configured to control the switch units to switch to another input source if one of the input sources is determined to be inadequate.

4. The power redundant system in claim 3, wherein the input sources comprise a first input source and a second input source, and wherein the switch unit comprises:
   a first switch comprising one side of the first switch configured to receive the first input source, and an other side of the first switch connected to one of the power-supplying units correspondingly; and
   a second switch comprising one side of the second switch configured to receive the second input source, and an other side of the second switch connected to an other side of the first switch,
   wherein if the first input source is determined to be inadequate, the control unit switches the switch units to output the second input source by controlling the first switch to be turned off and the second switch to be turned on, and wherein
   if the second input source is determined to be inadequate, the control unit switches the switch units to output the first input source by controlling the second switch to be turned off and the first switch to be turned on.

5. The power redundant system in claim 4, wherein the switch units switch according to a switching time, the switching time being configured to be a time between the first switch being turned off and the second switch being turned on; or between the second switch being turned off and the first switch being turned on.

6. The power redundant system in claim 5, wherein the switching time is less than or equal to ten milliseconds.

7. The power redundant system in claim 2 further comprising:
   a plurality of control units connected to the switch units, the control units being configured to control the switch units to switch to another input source if one of the input sources is determined to be inadequate.

8. The power redundant system in claim 7, wherein the input sources comprise a first input source and a second input source, and wherein the switch unit comprises:
   a first switch comprising one side of the first switch configured to receive the first input source, and an other side of the first switch connected to one of the power-supplying units correspondingly; and a second switch comprising one side of the second switch configured to receive the second input source, and an other side of the second switch connected to an other side of the first switch, wherein if the first input source is determined to be inadequate, the control unit switches the switch units to output the second input source by controlling the first switch to be turned off and the second switch to be turned on, and wherein if the second input source is determined to be inadequate, the control unit switches the switch units to output the first input source by controlling the second switch to be turned off and the first switch to be turned on.

9. The power redundant system in claim 8, wherein the switch units switch according to a switching time, the switching time being configured to be a time between the first switch being turned off and the second switch being turned on; or between the second switch being turned off and the first switch being turned on.

10. The power redundant system in claim 9, wherein the switching time is less than or equal to ten milliseconds.

11. The power redundant system in claim 1, wherein the switch units are automatic transfer switches.

12. The power redundant system in claim 1 further comprising a first rack accommodating the switch module and the power-supplying module.

13. The power redundant system in claim 12, wherein the first rack comprises a plurality of first accommodation spaces and a plurality of second accommodation spaces, and wherein the first accommodation spaces and the second accommodation spaces are interlaced located beside each other.

14. The power redundant system in claim 13, wherein the switch units and the power-supplying units are randomly arranged in the first accommodation spaces and the second accommodation spaces.

15. The power redundant system in claim 1 further comprising a first rack and a second rack, wherein the first rack accommodates the switch module, the second rack accommodates the power-supplying module, and the switch module is connected to the power-supplying module.

16. The power redundant system in claim 1, wherein each power-supplying unit comprises at least a power supply and converts the input power into the output power; and wherein if one of the switch units or one of the power-supplying units is not operational, the power supply connected correspondingly does not output power or does not supply the electric power that is the same as the electric power supplied by other power-supplying units.

17. An operation method for a power redundant system, the power redundant system comprising a switch module having a plurality of switch units and a power-supplying module having a plurality of power-supplying units, the operation method comprising:

(a) providing a power redundant system configuration, wherein each switch unit is configured to switch on to connect only one corresponding power-supplying unit to an input power;

(b) converting the input power into an output power by the power-supplying module to supply the output power to a load;

(c) controlling the switch units to switch one of the input sources as the input power;

(d) if one of the switch units or one of the power-supplying units is not operational, supplying by the power-supplying units connected to the remaining switch units correspondingly, an electric power being greater than or equal to an electric power required by the load; and (e) if one of the input sources is determined to be inadequate, controlling the switch units to switch to another input source.

18. The operation method in claim 17, further comprising: controlling the switch units to switch from a first input source to a second input source if the first input source is determined to be inadequate; and controlling the switch units to switch from a second input source to a first input source if the second input source is determined to be inadequate.

19. The operation method in claim 18, further comprising: switching from the first input source to the second input source within a first switching time; and switching from the second input source to the first input source within a second switching time.

20. The operation method in claim 19, wherein the first switching time and/or the second switching time is equal to or less than ten milliseconds.

* * * * *